United States Patent
Ketelaars et al.

(10) Patent No.: US 7,202,658 B2
(45) Date of Patent: Apr. 10, 2007

(54) PISTON VELOCITY DETECTOR

(75) Inventors: Andy W. Ketelaars, Milton (CA); Heiner Ophardt, Vineland (CA)

(73) Assignee: Eldesco Corporation, Oakville, Ontario (CA)

( * ) Notice: Subject to any disclaimer, the term of this patent is extended or adjusted under 35 U.S.C. 154(b) by 90 days.

(21) Appl. No.: 10/999,129

(22) Filed: Nov. 29, 2004

(65) Prior Publication Data

US 2005/0231192 A1    Oct. 20, 2005

(30) Foreign Application Priority Data

Apr. 20, 2004    (CA)    ................................ 2464911
Jun. 23, 2004    (CA)    ................................ 2471982

(51) Int. Cl.
*G01B 7/14*    (2006.01)
*G01P 3/48*    (2006.01)

(52) U.S. Cl. .................. 324/207.24; 324/174
(58) Field of Classification Search ........... 324/207.24, 324/174
See application file for complete search history.

(56) References Cited

U.S. PATENT DOCUMENTS

| | | | |
|---|---|---|---|
| 3,129,347 A | 4/1964 | Tognola | |
| 4,726,627 A | 2/1988 | Frait et al. | |
| 4,786,218 A * | 11/1988 | Feuser | 409/2 |
| 5,231,352 A * | 7/1993 | Huber | 324/207.24 |
| 5,233,293 A * | 8/1993 | Huang et al. | 324/207.15 |
| 5,296,807 A | 3/1994 | Kousek et al. | |
| 5,365,791 A | 11/1994 | Padula et al. | |
| 5,581,179 A | 12/1996 | Engel et al. | |
| 6,050,143 A | 4/2000 | Smith | |
| 6,057,682 A | 5/2000 | McCurley et al. | |
| 6,118,270 A | 9/2000 | Singer et al. | |
| 6,346,806 B1 * | 2/2002 | Schabuble et al. | 324/207.14 |
| 6,622,109 B2 | 9/2003 | Ermer et al. | |
| 2003/0030431 A1 | 2/2003 | Reininger | |

\* cited by examiner

*Primary Examiner*—Reena Aurora
(74) *Attorney, Agent, or Firm*—Riches, McKenzie & Herbert LLP

(57) ABSTRACT

A piston velocity detector to determine the velocity of a magnet carrying piston in a cylinder, preferably in the form of a self-contained, hand-held, battery powered piston velocity detector including a plurality of magnet field sensors disposed in an array fixedly spaced from each other within the detector.

20 Claims, 7 Drawing Sheets

PISTON VELOCITY DETECTOR

SCOPE OF THE INVENTION

This invention relates to a velocity detection device to be located near a piston carrying a magnet to determine the speed of movement of the piston.

BACKGROUND OF THE INVENTION

Pneumatic cylinders are used for various purposes including automated control of machinery and robotics. The pneumatic cylinders have a piston which is linearly moveable within the cylinder. The present inventor has appreciated that the speed of movement of the piston within the cylinder is an important consideration during initial set up of operation of a machine and as well to be considered during maintenance or troubleshooting. However, typically there is no capability for providing an indication of piston speed.

SUMMARY OF THE INVENTION

To at least partially overcome these disadvantages of previously known devices, the present invention provides a piston velocity detector to determine the velocity of a magnet carrying piston in a cylinder, preferably in the form of a self-contained, hand-held, battery powered piston velocity detector including a plurality of magnet field sensors disposed in an array fixedly spaced from each other within the detector.

An object of the present invention is to provide a velocity detector to determine the velocity of a magnet-carrying piston in the cylinder. Another object is to provide a velocity detector to determine the velocity of a magnet moving past the detector.

Another object is to provide a hand-held velocity detector particularly adapted to determine the velocity of a magnet-carrying piston in a cylinder.

Another object is to provide a method of determining the velocity of a magnet-carrying piston in a cylinder.

Another object is to provide a sensor for a magnetic piston position or velocity determiner which uses movement of the magnetic piston as a power source.

Another object is to provide a method for set up, maintenance and/or troubleshooting of pneumatic cylinders having magnetised pistons.

In one aspect the present invention provides a piston velocity detector to determine the velocity of a magnet carrying piston in a cylinder, the detector comprising:

a plurality of magnetic field sensors capable of sensing magnetic field and providing output signals corresponding to the strength of magnetic field, each of the sensors disposed in array fixedly spaced from other of the sensors, electric circuitry which determines, from the output signals from each sensor on movement of the piston past the detector, the relative time when a magnet carried by the piston is closest to each sensor, and calculates therefrom an estimated velocity of the piston based on the relative positions of the sensors in the array, preferably wherein the electric circuitry for each respective sensor determining after the output signal reaches an absolute threshold when the output signal next becomes zero, and measuring the time between the zero output signal of one of the sensors and the zero output signal of another of the sensors, and more preferably further including a display mechanism to display the estimated velocity in a human readable form.

DETAILED DESCRIPTION OF THE DRAWINGS

Further aspects and advantages of the present invention will become apparent from the following description taken together with the accompanying drawings in which.

DETAILED DESCRIPTION OF THE DRAWINGS

Figure 1:
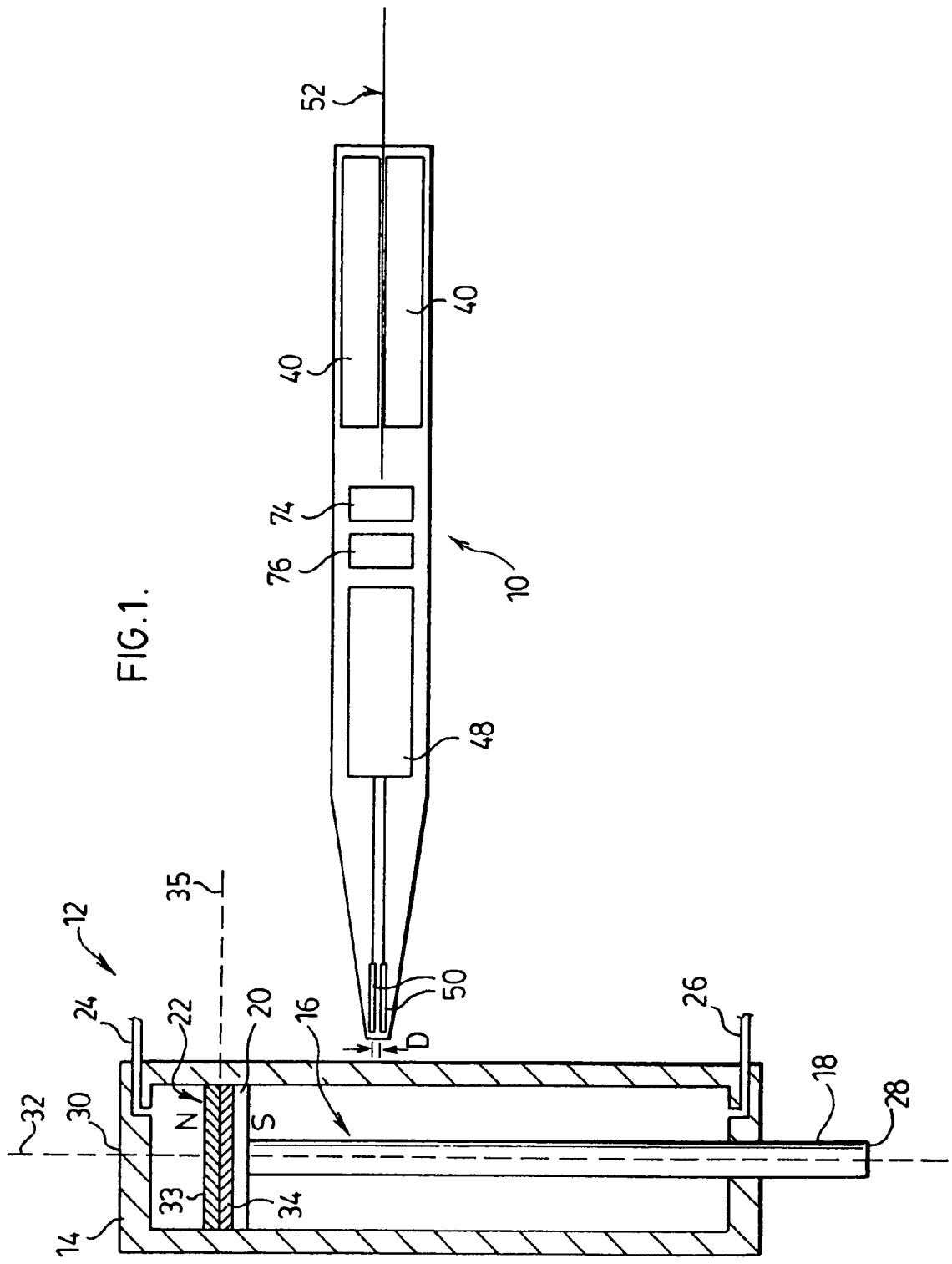
FIG. 1 is a schematic side view of a pneumatic cylinder in conjunction with a hand-held detector in accordance with the first embodiment to the present invention.

Reference is made first to FIG. 1 which illustrates as 10 a self-contained, hand-held, battery powered piston velocity detector 10 in accordance with the present invention schematically disposed adjacent a pneumatic actuating cylinder mechanism 12 comprising an enclosed cylindrical cylinder 14 within which a piston 16 is axially slidable. The piston 16 includes a piston rod 18 and a piston head 20. The piston head 20 includes and carries a permanent magnet 22. The rod 18 extends out one end of the cylinder in a sealed relation as is known. Two air lines 24 and 26 are schematically illustrated to communicate with each closed end of the cylinder. While not shown, each of these air lines 24 and 26 are adapted, to in a controlled manner, be selectively coupled to either vent air from the cylinder or apply pressurized air to the cylinder. In known manner, the velocity of movement of the piston 16 can be controlled as by controlling flow valves which may control the rate at which air may enter or exit the air lines to the cylinder.

In use, the outer end 28 of the piston 18 may be connected to one element and a far end 30 of the cylinder 14 may be connected to another element such that the movement of the piston 18 in the cylinder 14 provides relative movement between the elements.

The piston 18 is coaxially slidable within the cylinder 14 about a cylinder axis 32.

FIG. 1 schematically shows the detector 10. The detector 10 as best seen in a schematic pictorial exploded view in FIG. 2 preferably has upper and lower outer casing 34 and 36 carrying a circuit board 38 there between. The circuit board 38 carries a pair of batteries 40 to provide power for electronic circuitry including a central processing unit 42, two manual switches 44 and 46, an array of magnetic field sensors 50 and a liquid crystal display 48. The detector 10 is preferably sized so as to be hand-held and preferably is in the size of a normal writing instrument such as a pen or pencil having for example a length in the range of 8 to 20 centimetres and a width in the range of preferably about 1 to 2 centimetres.

In the preferred embodiments, the magnetic field sensors 50 are preferably Hall effect sensors. Hall effect sensors are well known and for example are used to provide a voltage signal proportional, preferably directly proportional, to the strength of the magnetic field sensed by the Hall effect sensors. Such sensors are well known and for example sensors of this type are described in U.S. Pat. No. 5,581,179 to Engela et al.

A preferred manner of use of the Hall effect sensors in accordance with the present invention is to provide at least two sensors at different axial positions relative to the axis of the cylinder 14 such that, on the piston head 20 moving past the sensors 50, to determine the time when the piston head 20 is closest to each sensor 50. For example, the magnet 22 and the piston head 20 can be estimated to be closest to each sensor 50 at a time when a voltage signal from that sensor is zero or at its maximum. From the different relative times that the magnet 22 carries by the piston is determined to be closest to each sensor 50, it is possible to calculate the estimated velocity of the piston 16 based on the relative positions of the sensors. The input from the sensors are provided to the central processing unit 42 where calculations are carried out and output is displayed on the LCD display 48 providing an estimated velocity in suitable units such as meters per second. The LCD display 48 of course provides the display in human readable form. If desired, the LCD 48 may also display frequency.

In the context of FIG. 1, the hand-held detector 10 is manually held proximate to the cylinder 14 with the two sensors 50 spaced apart a fixed distance indicated D. In this embodiment utilizing two sensors, the hand-held unit 10 needs to be held stationary adjacent the cylinder with the sensors 50 spaced from each other in a direction parallel to the cylinder axis 32.

In this regard in accordance with the present invention, the two Hall effect sensors 50 are spaced side by side in a symmetrical arrangement on either side of a plane of symmetry indicated as 52 which extends out of the plane of FIG. 1 normal to the axis 32. The planar face of the LCD display 48 is illustrated as being disposed in a plane normal to the plane of symmetry 52.

For proper reading with the two sensors 50 arranged as illustrated in FIG. 1, the detector 10 is to be arranged with its plane of symmetry 52 perpendicular to the axis 32. To state this another way, the detector 10 should be directed such that it extends perpendicularly away from the axis of the cylinder 14 and with the planar face of the LCD display 48 disposed in a plane which is parallel to the axis 32. The longitudinal configuration of the detector 10 and the planar face of the LCD display 48 as well as for example the relative orientation of the sides 54 and top 56 of the casing of the detector 10 provide visual indicators to a user as to a proper manner in to which to orient the detector 10 relative to any cylinder 14 to obtain an appropriate reading.

The magnet in the piston head is preferably oriented as seen in FIG. 1 such that its north pole 33 and south pole 34 are displaced parallel to the axis 32 of travel as schematically shown in FIG. 1 such that the magnetic field does not vary with rotation of the piston head about its axis 30 and the magnetic field is zero at a middle plane 35 normal to the axis 32 between the two north and south poles.

Figure 16:
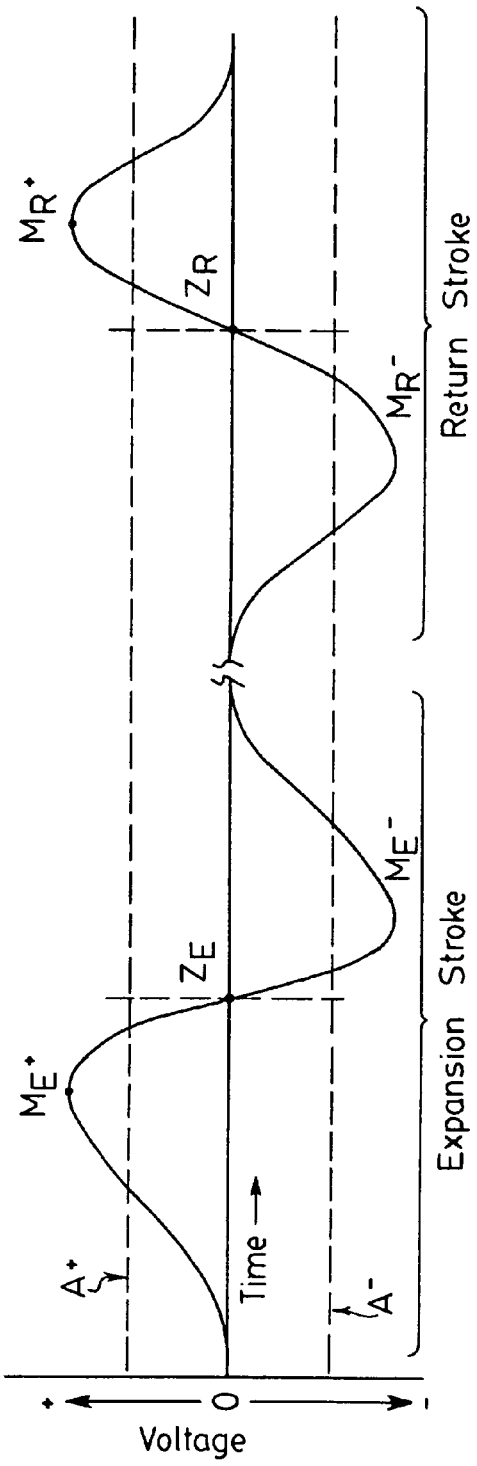
FIG. 16 is a graph plotting voltage versus time of a single sensor in a an extension stroke and a return stroke.

Reference is made to FIG. 16 which schematically illustrates the output signal from one sensor 50 representing the changes in voltage over time as the piston head moves past one sensor 50 in accordance with the first embodiment of the present invention in a cycle of operation representing an extension stroke followed by a return stroke and with a magnetic piston head as seen in FIG. 1 having a negative pole on its extension side.

As seen in the extension stroke, as the head approaches with a lead north (positive) pole approaching the sensor 50, the voltage rises to a positive maximum $M_E+$ then decreases to zero at $Z_E$ when the middle zero plane 35 passes through the sensor 50. Subsequently, the voltage increases to a negative maximum $M_E-$ as the trailing south (negative) pole retreats from the sensor 50. Similarly, in a return stroke, as the head approaches with a lead south (negative) pole, the voltage rises to a negative maximum $M_R-$, then decreases to zero at $Z_R$ when the middle zero plane 35 passes through the sensor 50 and subsequently increases to a positive maximum $M_R+$.

A preferred method of estimating when the piston passes a sensor is by determining when the voltage is zero at that sensor. This can be accomplished by determining when in any stroke the voltage increases above an absolute minimum threshold as for example set as minimum A+ or A− as shown in FIG. 16. In the extension stroke on sensing the voltage rising to be greater than absolute A, the control circuit will then determine the time when the voltage has become zero at $Z_E$. Similarly, in a return stroke, on sensing the voltage increases to absolute A, the control circuit will then determine the time when the voltage then becomes zero at $Z_R$.

Figure 17:
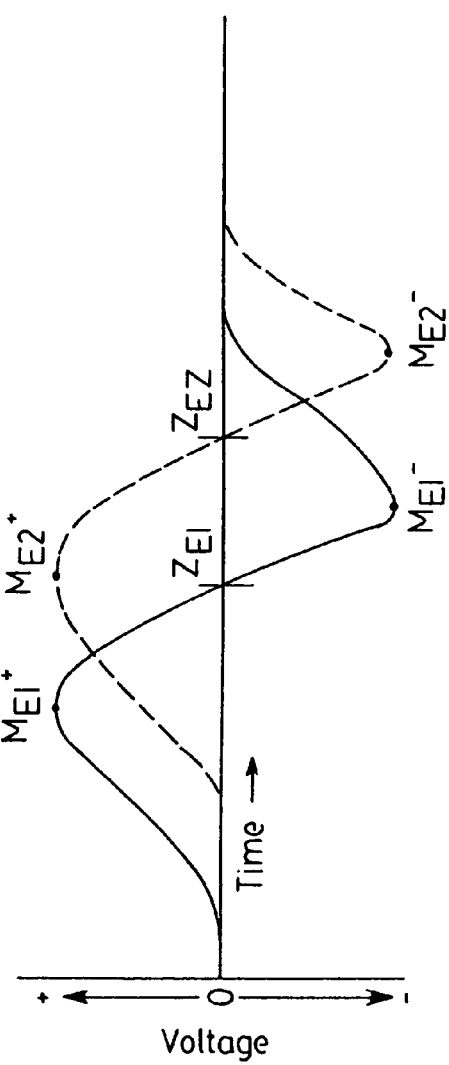
FIG. 17 is a graph plotting voltage versus time of two spaced sensors in an extension stroke.

Reference is made to FIG. 17 which illustrates the voltage measured from two sensors 50 in the embodiment of FIG. 1 over time in an extension stroke with one of the sensor's voltage shown as a solid line and the other sensor's voltage shown as a dashed line. Preferably, the time between zero point $Z_{E1}$ of one sensor and zero point $Z_{E2}$ of a second sensor is determined and used to calculate the speed of the piston between the two sensors knowing the distance between the two sensors.

Another method of calculating the speed it to determine the time when the voltage is at a maximum and use the time between the maximums to calculate the speed knowing the distance between the sensors. For example, the time of the positive maximum $M_{E1}+$ of one sensor and the time of positive maximum $M_{E2}+$ of a second sensors can be measured to determined the time there between. Alternatively, the time between the negative maximums $M_{E2}-$ of one sensor and $M_{E2}-$ of a second sensor can be measured to determine the time there between. Further, in other methodologies, each of the zero points and plus and negative maximum points can be determined and can be used in an averaging algorithm so as to estimate the time when the piston passes by each of the sensors and therefore the speed.

The speed of the piston can be separately calculated for each extension stroke and each return stroke with both being displayed if desired. In accordance with the present invention, the orientation of the piston, that is, to have either a leading north pole or a leading south pole in an extension stroke may be known or initially determined. With knowledge as to which of the north or south poles of the magnetic piston head lead in the extension stroke, the device may, having regard to the voltage curve, determine whether the stroke being measured is either an extension stroke or retraction stroke and suitably display speeds of each which may be relevant in certain situations.

The detector 10 preferably has manual controls for use by a user. The preferred embodiment of FIGS. 1 and 2 has merely two controls one comprising a reset button 74 and the other comprising a hold button 76. The detector 10 is preferably arranged such that after any use the electrical circuitry will turn itself off following a period of time, for example thirty seconds. The reset button 74 effectively serves as firstly an on button to turn the device on and secondly as a button to cancel the previous display on the LCD display 48 readying the detector for an additional measurement. The detector is preferably provided with circuitry such that merely one velocity measurement is made at a time and the LCD display will display the reading from that one measurement for a stated period of time for example thirty seconds. If the measurement is desired to be held for a longer period of time as for example three minutes then the hold button 76 is pushed for continued longer display.

Figure 3:
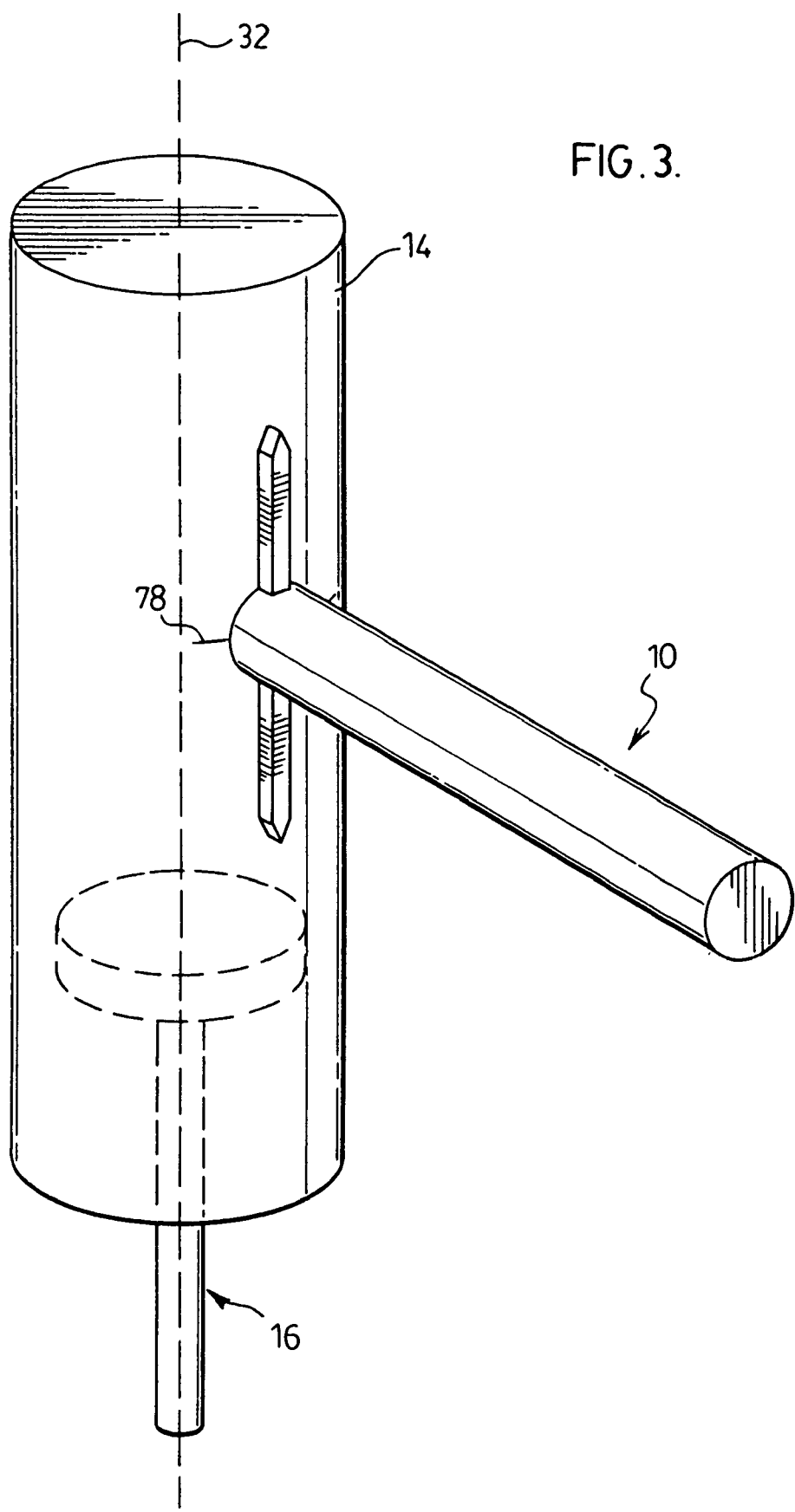
FIG. 3 is a schematic pictorial view showing a cylinder and a hand-held detector in accordance with a second embodiment of the present invention.
Figure 4:
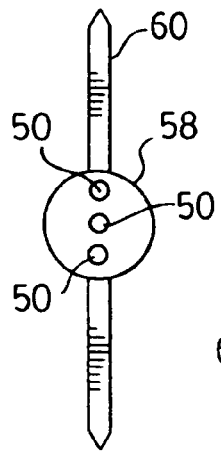
FIG. 4 is an end view of the detector shown in FIG. 3.
Figure 5:
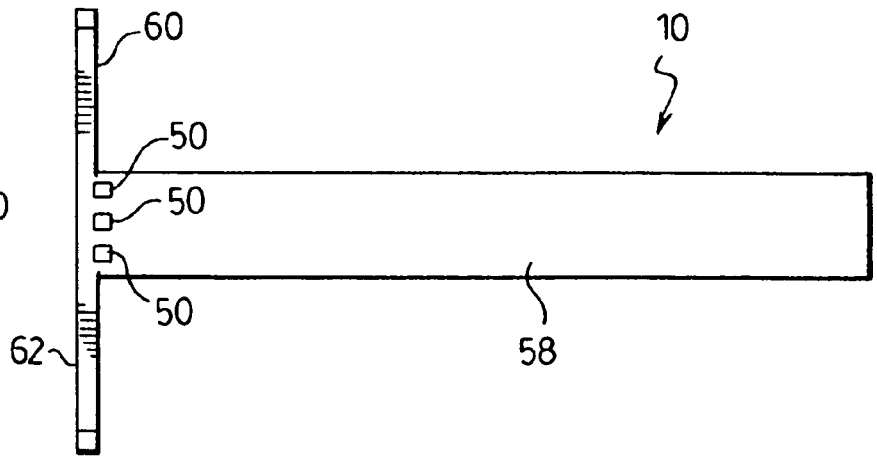
FIG. 5 is a schematic side view of the detector shown in FIG. 3.

Reference is made to FIGS. 3, 4 and 5 which illustrate a second embodiment of a detector 10 in accordance with the present invention which is substantially identical to that shown in the first embodiment but utilizes a detector having a different casing. The detector 10 illustrated in FIGS. 3 to 5 has a cylindrical body 58 which carries at one end a locating arm 60. The locating arm 60 comprises an elongate rod with a flat surface 62 adapted to be placed in engagement with the outer surface of the cylinder 14. The locating arm 60 is elongate and adapted such that the arm extends longitudinally parallel to the axis 32 of the cylinder when the detector 10 is in a desired position. The arm 60 is secured to the detector body 58 in a manner that with the arm 60 engaging the surface of the cylinder the main body 58 of the detector 10 extends perpendicular to the surface of the cylinder.

The detector illustrated in FIGS. 3 to 5 includes three Hall effect sensors 50 which sensors as best seen in the end view of FIG. 3 and the side view of FIG. 4 are in a straight line located in an array spaced a fixed distance from each other a constant distance from the surface 62 of the arm 60 and longitudinally relative to the arm 60.

The arm 60 in combination with the detector body 58 thus provides a visual indicator to a user as to how to orient the detector 10 by location engaging or adjacent a cylinder to provide for an accurate measurement of the velocity.

In accordance with the embodiment illustrated in FIGS. 3 to 5, the locating arm 60 may be a separate removable element which can be removed to facilitate carrying of the sensor in a pocket or may be removable to be received in a recess provided in the main detector for easy carrying. The locating arm 60 may also be hinged or foldable so as to be folded to extend along the sides of the main body 58 of the detector in use. Insofar as the locator arm 60 is removable, then suitable registry means are to be provided for coupling the locating bar 60 to the main body 58 of the detector to ensure that the locating arm is oriented in a preferred orientation relative to the detector body as is required.

In respect of calculations required in respect of the two or three or more sensor detectors illustrated in FIGS. 1 and 5, with the sensors correctly oriented parallel to the axis 32, and knowing the distance between any two of the sensors, the velocity of the piston head can be determined merely by calculating the time the piston head takes to pass between the two sensors and dividing the distance between the two sensors by this time.

The speed of the piston between two sensors is of course a calculation or estimation of the average speed or average velocity of the piston head between the two sensors. In addition to estimating the speed of the piston head, it is possible in accordance with the device and method of the present invention to estimate the acceleration.

Acceleration can be estimated with the three sensors of FIGS. 3 to 5 arranged longitudinally of the axis 32 by determining the time that the piston passes each sensor, calculating the average speed between each adjacent pair of sensors such that the difference in speed between the pairs of sensors can be used towards calculating an average acceleration between the most remote sensors.

The relative speed of the piston on either side of a zero voltage point can also be used to give an indication as to the extent to which the piston is accelerating or deaccelerating.

FIG. 17 illustrates an example in which in an extension stroke, the piston head is accelerating. This is apparent in that the voltage curve for the first sensor appears such that the positive maximum $M_{E1}+$ prior to $Z_{E1}$ is further from the zero point than $M_{E1}-$, the negative maximum after the piston head is past the zero point. Insofar as suitable measurements are taken at one, two or more sensors, then an estimate of the acceleration at each of the sensors can be made.

For convenience the sensors in FIGS. 3 to 5 and 6 to 13 are shown in solid lines even though they are not visible from outside the detector 10 and would normally be shown in dashed lines. For convenience also FIGS. 3 to 5 and 6 to 13 the equivalent of the LCD display and switches are not shown.

Reference is now made to FIGS. 6 to 13 which illustrate third to sixth embodiments of detectors in accordance with the present invention adopting different configurations of fixed arrays for sensors to be used with detectors in accordance with the present invention.

Figure 6:
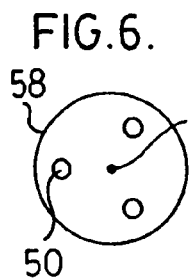
FIGS. 6 and 7 are respectively an end view and a side view similar to FIGS. 4 and 5 but showing a third embodiment of a detector in accordance with the present invention.
Figure 7:
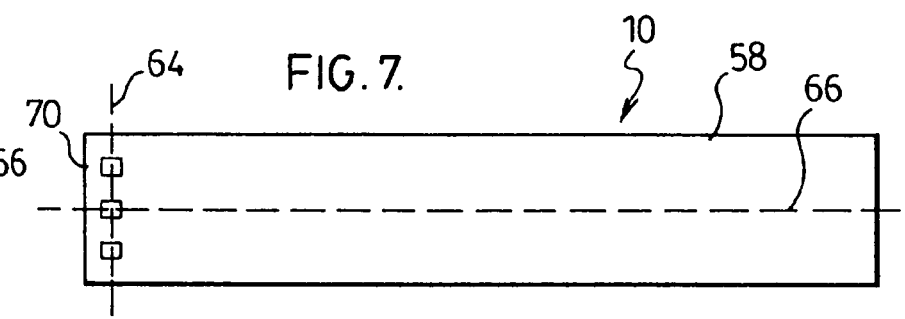

Referring to FIGS. 6 and 7, three sensors 50 are shown as provided in a triangular array. The three sensors 50 are all disposed in a common flat plane 64 and this plane 64 is preferably normal to a longitudinal centre axis 66 centrally through the detector body 58. In accordance with the embodiment illustrated in FIGS. 6 and 7, preferably the forward end of the detector 10 provides a flat planar surface 70 parallel to the plane 64 in which the three sensors 50 lie. Preferably the flat forward surface 70 of the detector is engaged adjacent the outer surface of the cylinder 14 to extend tangently thereto in which case the longitudinal centre axis 66 through the main body of the detector 10 would be normal to the axis 32 of the cylinder. In accordance with the embodiment in FIG. 6, accurate velocity measurement may be detected in every rotational position the detector may assume as rotated about its longitudinal centre axis 66. The relative time that the piston head passes each sensor can be used with trigonometric functions assuming the piston speed is constant to determine the relative orientation of the sensors 50 in the flat plane 64 relative to axis 32 and hence the speed of the piston head parallel the axis 32.

Figure 8:
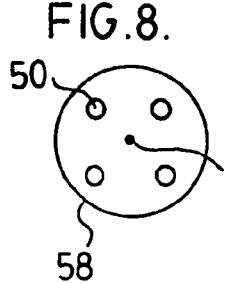
FIGS. 8 and 9 are respectively an end view and a side view similar to that in FIGS. 4 and 5 but of a detector in accordance with a fourth embodiment of the present invention.
Figure 9:
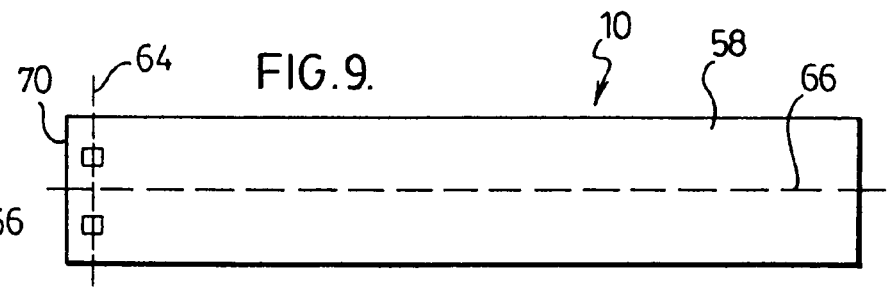

FIGS. 8 and 9 illustrate an embodiment substantially identical to that in FIGS. 6 and 7 however having four sensors 50 arranged in a plane 64 equally distanced from the flat front end surface 70 of the detector 10 as in a square. Operation and use of the embodiment of FIGS. 8 and 9 are substantially the same as with FIGS. 6 and 7.

In the context of the sensor illustrated in FIGS. 6 and 7, the relative time that the piston head passes each of the three sensors 50 will provide a trigonometric function to calculate the velocity having regard to the spacing of the sensors within their common plane 64 and the time the piston passes each sensor. As a simple example, if the three sensors are arranged in a right triangle and the piston passes two of the sensors on a first side of the right triangle at the identical time then the velocity can be calculated by dividing the distance between the two sensors on the other, second right side of the triangle with the difference in time that the piston moves between those two sensors. Similar arrangements can be made with triangles of other known shapes. Similarly, insofar as in accordance with the embodiments of FIGS. 8 and 9 there are more than three sensors in the same plane then similar geometric calculations can be made with the additional sensors providing for increased accuracy.

All of the calculations of course in accordance with the embodiments of FIGS. 1 to 8 assume that the detector 10 is held fixed in the desired orientation for its array relative to the cylinder. The velocity is calculated indicative of the average speed.

Figure 10:
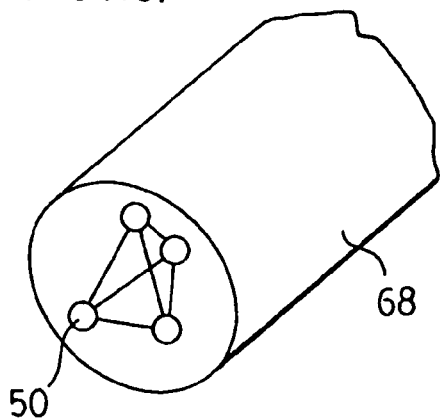
FIG. 10 is a schematic pictorial view of an end of a detector in accordance with a fifth embodiment of the invention.
Figure 11:
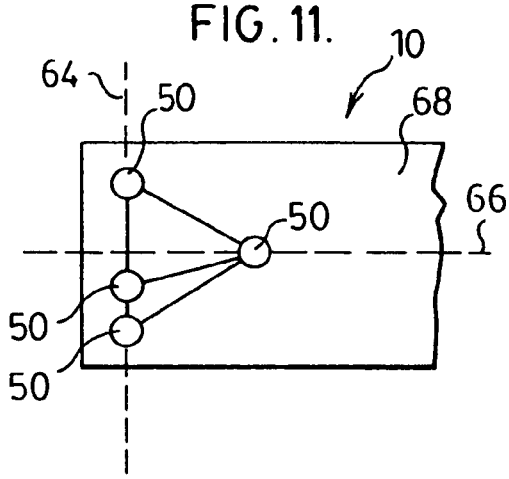
FIG. 11 is a side view of the detector of FIG. 10.

Reference is made to FIGS. 10 and 11 which illustrate the use of four sensors 50 however disposed in a pyramid as shown with three of the sensors disposed in a triangle in a plane 64 parallel to the flat front surface 70 of the detector 10 and the fourth disposed spaced from this plane 64. With the embodiment illustrated in FIGS. 10 and 11, the detector 10 may be used by merely placing the end of the detector 10 adjacent the cylinder and accurate readings can be obtain irrespective of the angular orientation of the detector's central axis 66 relative to the cylinder. For identical sensors, the relative strength of the maximum voltages M+ or M− can be used to estimate the distance of each sensor from the axis 32 of the piston. The relative distance of each sensor from the axis 32 can be used to determine, for example, with the sensor array arrangement as illustrated in FIGS. 10 to 13, the spatial orientation of the array relative to the axis 32. The orientation of the array relative to the axis can be used in calculations, for example in combination with information as to the time of zero voltage field for each sensor to determine velocity of the piston head even when the sensor array is not placed in predetermined distance or orientation relative to the piston.

Figure 12:
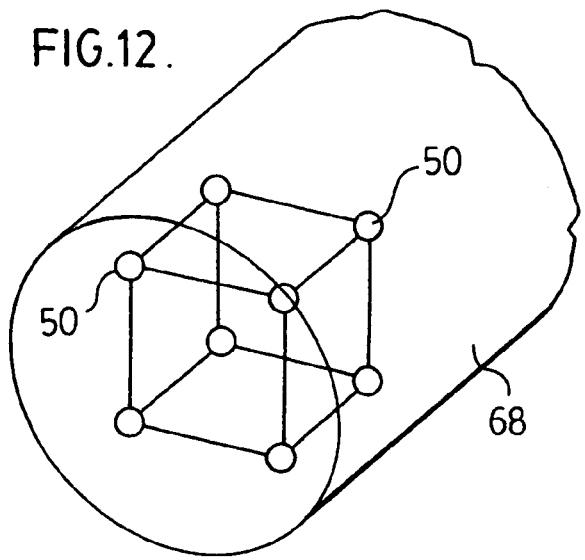
FIG. 12 is a schematic pictorial view of an end of a detector in accordance with a sixth embodiment of the present invention.
Figure 13:
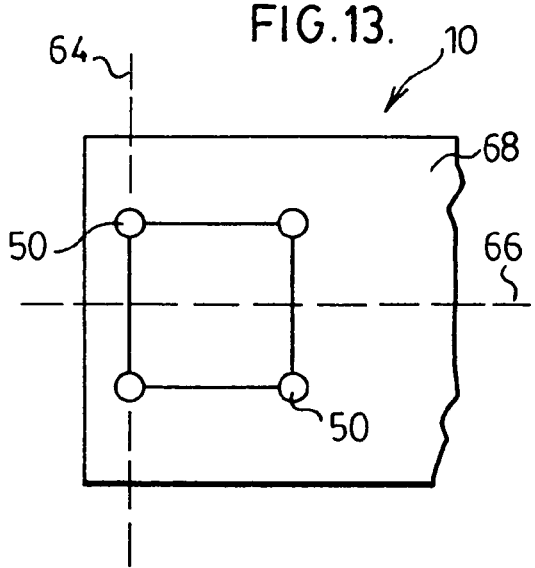
FIG. 13 is a side view of the detector of FIG. 12.

FIGS. 12 and 13 illustrate a three dimensional array incorporating six sensors 50 each disposed at the corner of a cube. As is the case with the array in FIGS. 10 and 11, a detector 10 incorporating the sensors in the three dimensional array of FIG. 12 can provide for accurate sensing irrespective of the relative orientation of the array relative to the cylinder.

In respect of the embodiments illustrated in FIGS. 10 and 13 which provide a three dimensional array of sensors, the sensors preferably are calibrated to provide for comparable signals with distance from the magnet as for example by each of the sensors being identical. With knowledge of the distance of each sensor from the magnet, in a similar manner that two dimensional trigonometric arrangements were developed in respect of the embodiments of FIGS. 6 to 9, three dimensional trigonometric calculations can be preformed and thus provide an estimate of the piston speed without the need for the detector array to be located in any particular three dimensional orientation relative to the cylinder or its axis.

In respect of the detectors having three or more sensors in an array and where not all such sensors are disposed on the same linear line then is it preferred to have each sensor provided, preferably to be identical, such that a signal produced by the magnet passing the sensor can provide an indication as to the distance of each sensor from the piston head. Information regarding the distance of each sensor from the piston head can be used towards calculating the relative direction of movement of the piston, that is, the orientation of the axis 32 of the cylinder relative to the orientation of the sensors in the array.

Figure 2:
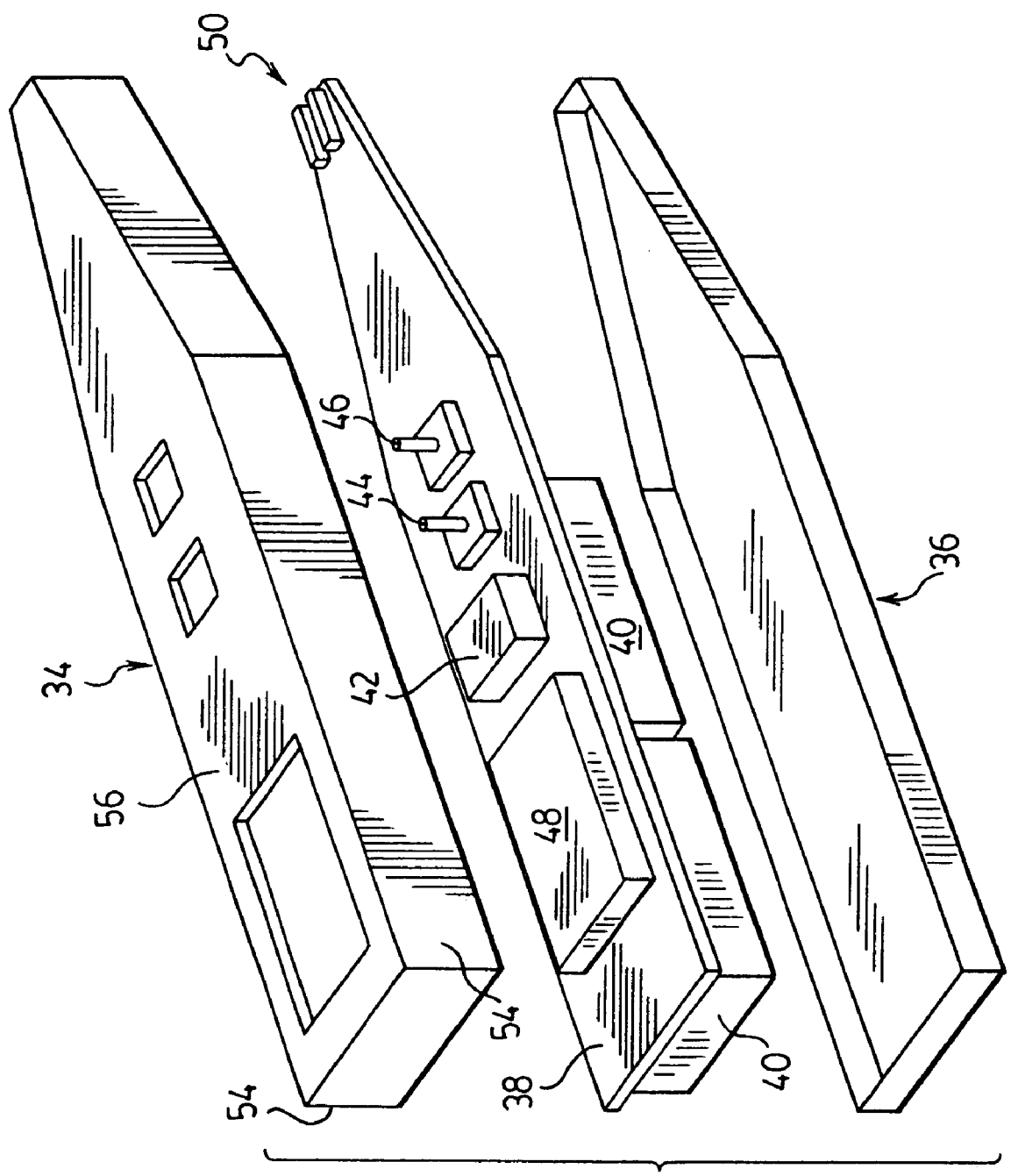
FIG. 2 is an exploded view of the detector of FIG. 1.

In accordance with the present invention there is provided a method for set up, maintenance and troubleshooting of cylinders. In accordance with this method, a user takes a measurement of the velocity of the piston in the cylinder at a specific location along the cylinder. Preferably this position is marked as for example by placing a label, ink marking, scratches, small drilled holes or engraving markings on the outside surface of the cylinder and recording the velocity at this point. Subsequently, in the event of maintenance and/or troubleshooting, further measurements may be made at the same location to determine consistency of use. Such a marking is indicated in FIG. 2 by a line 78.

Figure 14:
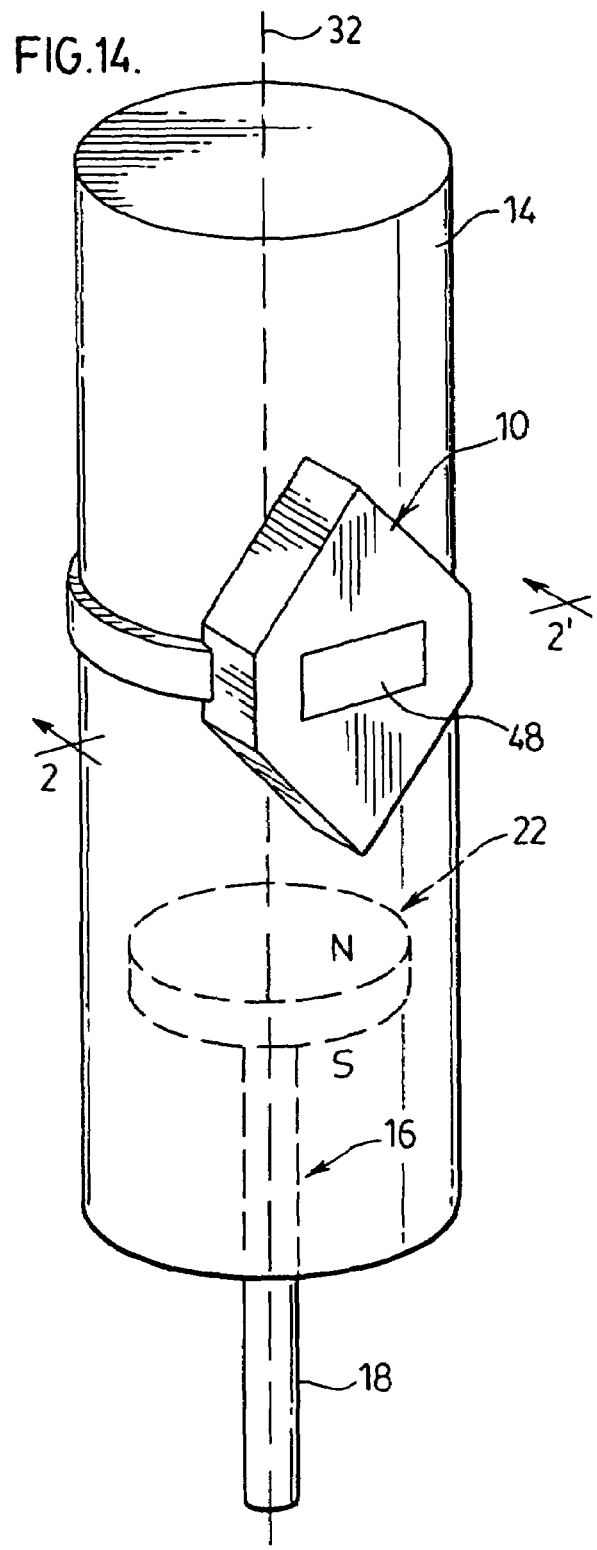
FIG. 14 is a schematic pictorial view showing a cylinder to which detector in accordance with a seventh embodiment is secured.
Figure 15:
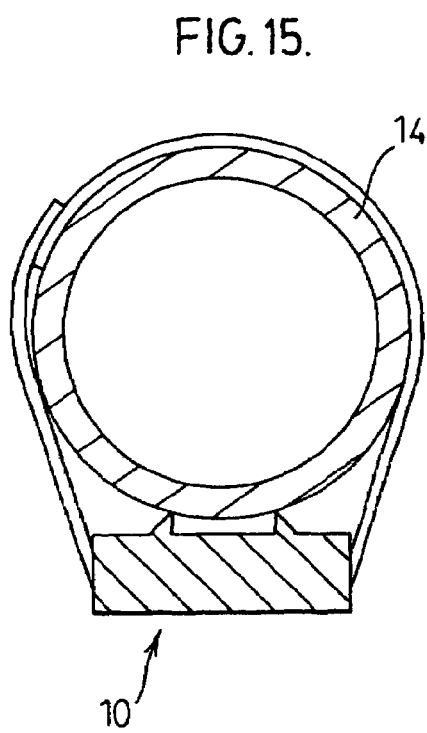
FIG. 15 is a cross-sectional view along section line 2—2' in FIG. 14.

Reference is made to FIG. 14 which shows a seventh embodiment of a speed sensor in accordance with the present invention. The sensor 10 of FIG. 14 is adapted to be removably secured to a piston 14 as by a releasable strap 36 which may be secured by Velcro (trade mark) type touch fasteners. Any means of securing may be used such as adhesives, double sided tapes, hose clamps and the like.

The sensor device 10 is secured to the cylinder at a fixed location with the sensor device 10 in a desired relative orientation.

The sensor device 10 is secured to the cylinder 14 at a fixed location with the sensor device 10 in a desired relative orientation. The sensor device 10 has arrow like ends to assist in visual location with the ends pointing in a direction parallel the axis 32. The rear of the sensor device 10 preferably is configured to assist location parallel the axis 32 of the cylinder. In this regard, two parallel ribs 38 are provided whose end apex are parallel to each other and adapted to contact different size cylindrical surfaces to locate the two ribs 38 parallel to the axis of the cylindrical surface. For cylinders of known external diameter the sensor device 10 may have a concave rear surface of a diameter corresponding closely to that of the exterior surface of the cylinder to assist in location of the sensor device parallel the axis of the cylinder. At least two sensors 52, not shown, are provided in the sensor device 10 at known locations preferably centered between the ribs and therefore to become located when the sensor device is secured to the cylinder in a plane parallel to the axis 32 with each sensor at constant distance from the axis 32.

The sensor device 10 preferably provides an output. The output preferably is in a visual display which can be manually read as in a liquid crystal display 48 however the output may be in other forms. The sensor device 10 could be hard wired to a computer interface. The sensor device 10 could provide an output in a wireless manner by the sensor device including a transmitter so as to for example send in a wireless manner a radio frequency signal to a remote receiver.

The sensor device 10 may be powered by batteries or by hard wiring into a power source. The sensor device may be powered by other sources such as solar charging panels or by receiving energy by reason of the movement of the magnetic head of the piston past electrical generating apparatus in the sensor device 10. In this regard, a small electrical power generator could be provided in the sensor device which on movement of the magnetic head past the sensor device 10 and thus the change of magnetic field through the sensor device 10 create electrical power. Various mechanisms may be provided whereby, by the change in magnetic field an electrical potential, current or voltage may be generated. Preferably, any such generation based on movement of the magnetic field would include some form of battery or other electrical storage or capacitive device which would permit the energy created by one or more passing of the magnetic piston head past the sensor device 10 to provide sufficient stored energy for operation of the device 10.

Each of the sensor devices 10 may be provided with the ability to record data over time and for downloading such data periodically. Providing a plurality of such fixed sensors on different pistons can provide for either immediate visual determination of information from the pistons or possibly provide for record keeping of operation of piston over some period of time. Various displays of information sensed by the sensor device 10 may be displayed including the frequency of piston stroke, that is, the number of extension strokes over time.

Many of the embodiments in accordance with the present invention may be desired to be relatively small inexpensive elements. Towards providing the sensor devices to have minimal cost, measurements involving locating a zero magnetic field after the magnetic field has reached a certain absolute threshold can provide a relatively simplistic algorithm which can be accommodated within relatively inexpensive digital control circuit chips which are conventional available. Insofar as more detailed calculations are desired than more expensive analog computer control chips may be utilized. Preferred inexpensive sensor devices may merely have simple visual display however more expensive devices may be adapted with ports for power input and/or data input and output. Data input can for example initial set up and/or alterations of operation conditions.

Incorporation of wireless technology such as a simple radio transmitter may be able to be provided in a relatively simple manner without unduly increasing the cost however may prove unnecessary. A simple receiver could be provided which could provide for visual display to an operator of the speed being experienced at a plurality of separate wireless sensors at the same time.

While the invention has been described with reference to preferred embodiments many modifications and variations will occur to persons skilled in the art. For a definition of the invention reference is made to the following claims.

We claim:

1. A piston velocity detector
to determine the velocity of a magnet carrying piston relative to a cylinder in which the piston is reciprocally movable,
the detector comprising:
a plurality of magnetic field sensors capable of sensing magnetic field and providing output signals corresponding to the strength of magnetic field, each of the sensors disposed in array fixedly spaced from other of the sensors,
electric circuitry which determines, from the output signals from each sensor on movement of the piston past the detector, the relative time when a magnet carried by the piston passes each sensor, and calculates therefrom an estimated velocity of the piston based on the relative positions of the sensors in the array,
wherein the magnet carrying piston has its north and south poles displaced in the direction of movement of the piston.

a determination is made as to the time when the output signal from each sensor is zero, and
for each sensor the electric circuit determines when the output signal is first zero after the output signal has increased beyond a pre-determined absolute threshold value.

2. A detector as claimed in claim 1 wherein the detector is a self contained hand-held battery powered detector.

3. A detector as claimed in claim 2 including a display mechanism to display the estimated velocity in a human readable form.

4. A detector as claimed in claim 1 wherein the piston is estimated as closest each sensor when the output signal is said first zero for that sensor.

5. A detector as claimed in claim 1 wherein the detector having external features visually apparent to a user in guiding the user in relative location of the detector to have the array of sensors in desired juxtaposition relative to piston carrying cylinder.

6. A detector as claimed in claim 5 wherein the detector having two sensors, the external feature guiding location of the detector with the two sensors spaced in a direction parallel an axis of the cylinder.

7. A detector as claimed in claim 5 wherein the detector having three sensors arranged in a triangle in a plane;
the external feature guiding location of the detector with the plane normal to a radius of an axis of the cylinder.

8. A detector as claimed in claim 1 wherein the detector includes a mechanism to generate electrical power to operate the detector from the movement of the magnet carrying piston relative the detector.

9. A detector as claimed in claim 1 wherein the electronic circuitry determines the time when the output signal from each sensor is at a positive or a negative maximum and estimates the piston to be closest each sensor when the output signal is the positive or negative maximum.

10. A detector as claimed in claim 1 wherein the plurality of sensors includes at least three sensors,
and the circuitry calculates the estimated velocity having regard to a calculated juxtaposition of the sensors relative to direction of movement of the piston.

11. A detector as claimed in claim 1 wherein the electronic circuitry determines the time when the output signal from each sensor is at a positive or a negative maximum and estimates the piston to be closest each sensor when the output signal is the positive or negative maximum.

12. A detector as claimed in claim 11 wherein the plurality of sensors includes at least three sensors,
and the circuitry calculates the estimated velocity having regard to a calculated juxtaposition of the sensors relative to direction of movement of the piston.

13. A piston velocity detector
to determine the velocity of a magnet carrying piston relative to a cylinder in which the piston is reciprocally movable,
the detector comprising:
a plurality of magnetic field sensors capable of sensing magnetic field and providing output signals corresponding to the strength of magnetic field, each of the sensors disposed in array fixedly spaced from other of the sensors,
electric circuitry which determines, from the output signals from each sensor on movement of the piston past the detector, the relative time when a magnet carried by the piston passes each sensor, and calculates therefrom an estimated velocity of the piston based on the relative positions of the sensors in the array, wherein the electronic circuitry determines the tune when the output signal from each sensor is at a positive or a negative maximum and estimates the piston to be closest each sensor when the output signal is the positive or negative maximum.

14. A detector as claimed in claim 13 wherein the plurality of sensors includes at least three sensors, and the circuitry calculates the estimated velocity having regard to a calculated juxtaposition of the sensors relative to direction of movement of the piston.

15. A piston velocity detector to determine the velocity of a magnet carrying piston relative to a cylinder in which the piston is reciprocally movable, the detector comprising:

a plurality of magnetic field sensors capable of sensing magnetic field and providing output signals corresponding to the strength of magnetic field, each of the sensors disposed in array fixedly spaced from other of the sensors, electric circuitry which determines, from the output signals from each sensor on movement of the piston past the detector, the relative time when a magnet carried by the piston passes each sensor, and calculates therefrom an estimated velocity of the piston based on the relative positions of the sensors in the array, wherein the plurality of sensors includes at least three sensors, and the circuitry calculates the estimated velocity having regard to a calculated juxtaposition of the sensors relative to direction of movement of the piston.

16. A piston velocity detector to determine the velocity of a magnet carrying piston relative to a cylinder in which the piston is reciprocally movable, the detector comprising:

a plurality of magnetic field sensors capable of sensing magnetic field and providing output signals corresponding to the strength of magnetic field, each of the sensors disposed in array fixedly spaced from other of the sensors, electric circuitry which determines, from the output signals from each sensor on movement of the piston past the detector, the relative time when a magnet carried by the piston passes each sensor, and calculates therefrom an estimated velocity of the piston based on the relative positions of the sensors in the array, including at least four detectors with three of said detectors arranged in a triangle in a plane and a fourth of said detectors spaced from the plane.

17. A detector as claimed in claim 16 wherein for each sensor the electric circuit determines when the output signal is first zero after the output signal has increased beyond pre-determined absolute threshold value.

18. A detector as claimed in claim 15 including measuring the maximum or minimum strength of the output signal for each sensor to estimate the distance of each sensor from the axis, and using the distance of each sensor from the axis to calculate the juxtaposition of the array relative the axis.

19. A piston velocity detector to determine the velocity of a magnet carrying piston relative to a cylinder in which the piston is reciprocally movable, the detector comprising:

a plurality of magnetic field sensors capable of sensing magnetic field and providing output signals corresponding to the strength of magnetic field, each of the sensors disposed in array fixedly spaced from other of the sensors, electric circuitry which determines, from the output signals from each sensor on movement of the piston past the detector, the relative time when a magnet carried by the piston passes each sensor, and calculates therefrom an estimated velocity of the piston based on the relative positions of the sensors in the array, including measuring the maximum or minimum strength of the output signal for each sensor to estimate the distance of each sensor from the axis, and using the distance of each sensor from the axis to calculate the juxtaposition of the array relative the axis.

20. A detector as claimed in claim 19 wherein the plurality of sensors includes at least three sensors, and the circuitry calculates the estimated velocity having regard to a calculated juxtaposition of the sensors relative to direction of movement of the piston.

* * * * *